United States Patent
Hu

(10) Patent No.: US 9,665,130 B2
(45) Date of Patent: May 30, 2017

(54) HINGE MODULE AND ELECTRONIC DEVICE USING THE SAME

(71) Applicant: Acer Incorporated, New Taipei (TW)

(72) Inventor: Li-Hau Hu, New Taipei (TW)

(73) Assignee: Acer Incorporated, New Taipei (TW)

( * ) Notice: Subject to any disclaimer, the term of this patent is extended or adjusted under 35 U.S.C. 154(b) by 156 days.

(21) Appl. No.: 14/630,668

(22) Filed: Feb. 25, 2015

(65) Prior Publication Data

US 2016/0153222 A1 Jun. 2, 2016

(30) Foreign Application Priority Data

Dec. 1, 2014 (TW) .............................. 103141589 A

(51) Int. Cl.
*G06F 1/16* (2006.01)
*E05D 3/02* (2006.01)
*E05D 11/10* (2006.01)

(52) U.S. Cl.
CPC ............ *G06F 1/1681* (2013.01); *E05D 3/022* (2013.01); *E05D 11/1064* (2013.01); *E05Y 2900/606* (2013.01)

(58) Field of Classification Search
None
See application file for complete search history.

(56) References Cited

U.S. PATENT DOCUMENTS

| | | | | | |
|---|---|---|---|---|---|
| 2004/0226138 | A1* | 11/2004 | Harmon | ............... | E05D 11/1064 16/284 |
| 2004/0261224 | A1* | 12/2004 | Li | ............... | H04M 1/0216 16/330 |
| 2005/0102798 | A1* | 5/2005 | Kato | ............... | H04M 1/0212 16/366 |
| 2005/0150081 | A1* | 7/2005 | Gan | ............... | H04M 1/0212 16/367 |
| 2006/0236505 | A1* | 10/2006 | Maatta | ............... | G06F 1/1681 16/366 |
| 2007/0123319 | A1* | 5/2007 | Hwang | ............... | G06F 1/1616 455/575.1 |
| 2007/0289097 | A1* | 12/2007 | Barnett | ............... | G06F 1/1616 16/342 |
| 2008/0115325 | A1* | 5/2008 | Chien | ............... | G06F 1/162 16/367 |
| 2009/0139056 | A1* | 6/2009 | Koshikawa | ............... | E05D 11/00 16/303 |
| 2010/0142131 | A1* | 6/2010 | Tang | ............... | G06F 1/1616 361/679.01 |

(Continued)

*Primary Examiner* — Courtney Smith
*Assistant Examiner* — Keith Depew
(74) *Attorney, Agent, or Firm* — Jianq Chyun IP Office

(57) ABSTRACT

A hinge module including a first part, a pushing element, a second part and an elastic element is provided. The first part has a containing slot, and the pushing part is located in the containing slot and being able to move along a direction. The second part has a hinge shaft, which rotatably passes through the containing slot along an axis, so as to make the first part and the second part rotate about the axis. The elastic element is disposed in the containing slot and pushes the pushing element, and the elastic element always drives the pushing part to move along the direction, so as to make the hinge shaft to rotatably abut between the pushing part and the first part. The direction is perpendicular to the axis. An electronic device is also provided.

16 Claims, 6 Drawing Sheets

(56) References Cited

U.S. PATENT DOCUMENTS

| | | | |
|---|---|---|---|
| 2010/0269298 A1* | 10/2010 | Chiang | G06F 1/1616 16/361 |
| 2011/0061197 A1* | 3/2011 | Shimomura | H04M 1/0216 16/303 |
| 2012/0106039 A1* | 5/2012 | Duan | H05K 5/0226 361/679.01 |
| 2014/0211416 A1* | 7/2014 | Fan | G06F 1/1681 361/679.55 |
| 2015/0169009 A1* | 6/2015 | Ghosh | G06F 1/1681 361/679.27 |
| 2016/0017648 A1* | 1/2016 | Petrelli | E05D 7/08 16/284 |

* cited by examiner

HINGE MODULE AND ELECTRONIC DEVICE USING THE SAME

CROSS-REFERENCE TO RELATED APPLICATION

This application claims the priority benefit of Taiwan application serial no. 103141589, filed on Dec. 1, 2014. The entirety of the above-mentioned patent application is hereby incorporated by reference herein and made a part of this specification.

BACKGROUND

Field of the Invention

The invention is directed to a connection device and more particularly, to a hinge module.

Description of Related Art

Along with the ongoing development of technologies, new generations of electronic products with more complex and user-friendly functions are coming forth to replace old products. Taking computers for example, the computers have gradually become an indispensable tool in daily lives and jobs of ordinary people. A notebook is provided with identical functions of a desktop computer and characteristics of being compact-size and light-weight, which is quite convenient for users to carry around.

Currently, a hinge structure used for connecting the notebook computer is generally manufactured by means of a machining process, such as a computer numerical control (CNC) process, a drilling process or the like. A metallic hinge structure manufactured by the aforementioned process has disadvantage of having a complicated process. Besides, the hinge joint among components of the metallic hinge structure also requires a lubricating oil or any other lubricant. However, after being used for a long time, the hinge structure often turns out to have more and more difficulties on rotation due to the consumption of the lubricating oil or the lubricant or the lubricating oil or the lubricant being contaminated by impurities, which even further causes noise due to direction friction among the metallic components during the rotation process. On the other hand, metal has a greater specific gravity, and the metallic hinge structure needs additional rustproof treatment on its surface, which has higher manufacturing cost and further causes affection to miniaturization of the notebook computer.

SUMMARY

The invention is directed to a hinge module having less components, but capable of providing better hinge capability, as well as retaining appropriate resistance difference during the rotation process.

According to an embodiment, the invention provides a hinge module, including a first part, a pushing element, a second part and an elastic element. The first part has a containing slot. The pushing element is movably disposed along a direction in the containing slot. The second part has a hinge shaft passing through the containing slot along an axis, so as to make the first part and the second part to rotate relatively about the axis. The elastic element is disposed in the containing slot and pushes the pushing element. The elastic element constantly drives the pushing element to move along the direction so as to make the hinge shaft to rotatably contact with the pushing element and the first part. The direction is perpendicular to the axis.

According to an embodiment, the invention provides an electronic device, including a first body, a second body and the hinge module. The first part is connected to the first body. The second part is connected to the second body. The hinge shaft rotatably passes through the containing slot along an axis, so as to make the first part and the second part to rotate relatively along the axis.

To sum up, the hinge module provided by the invention can provide good resistance while being rotated by means of the first part and the pushing element clipping the hinge shaft of the second part. The electronic device provided by the invention can provide a good opening and closing effect by means of the good resistance provided by the hinge module.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
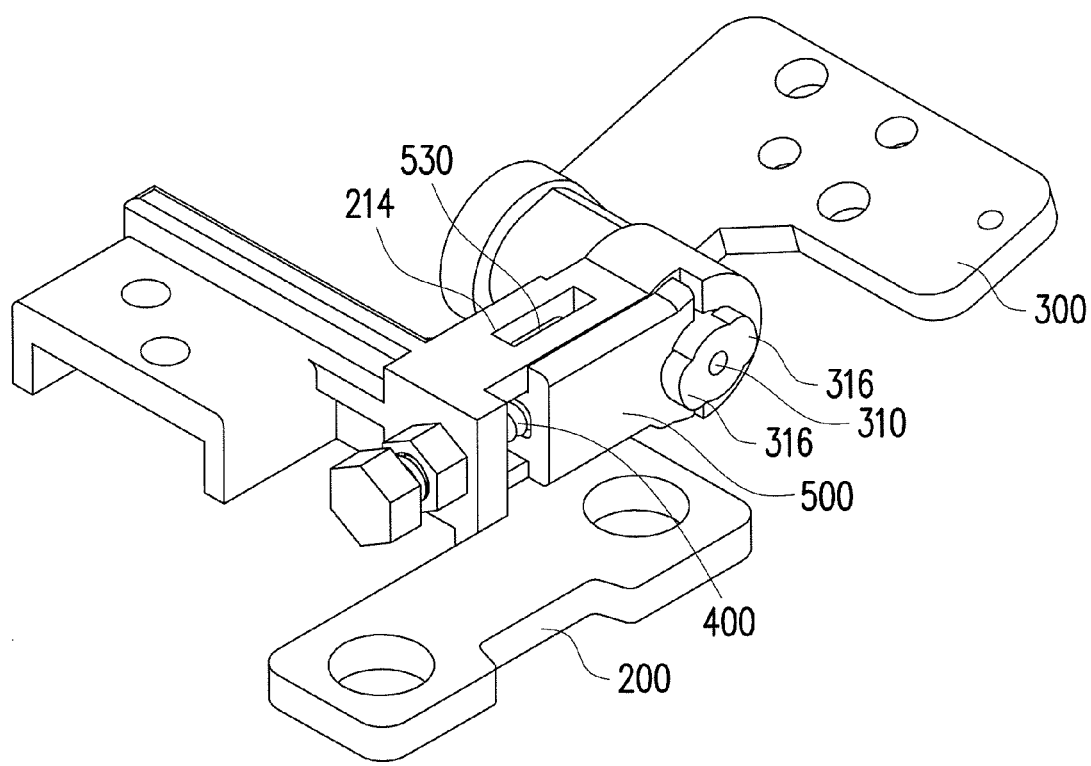
FIG. 1 is a schematic diagram illustrating a hinge module according to an embodiment of the invention.
Figure 2:
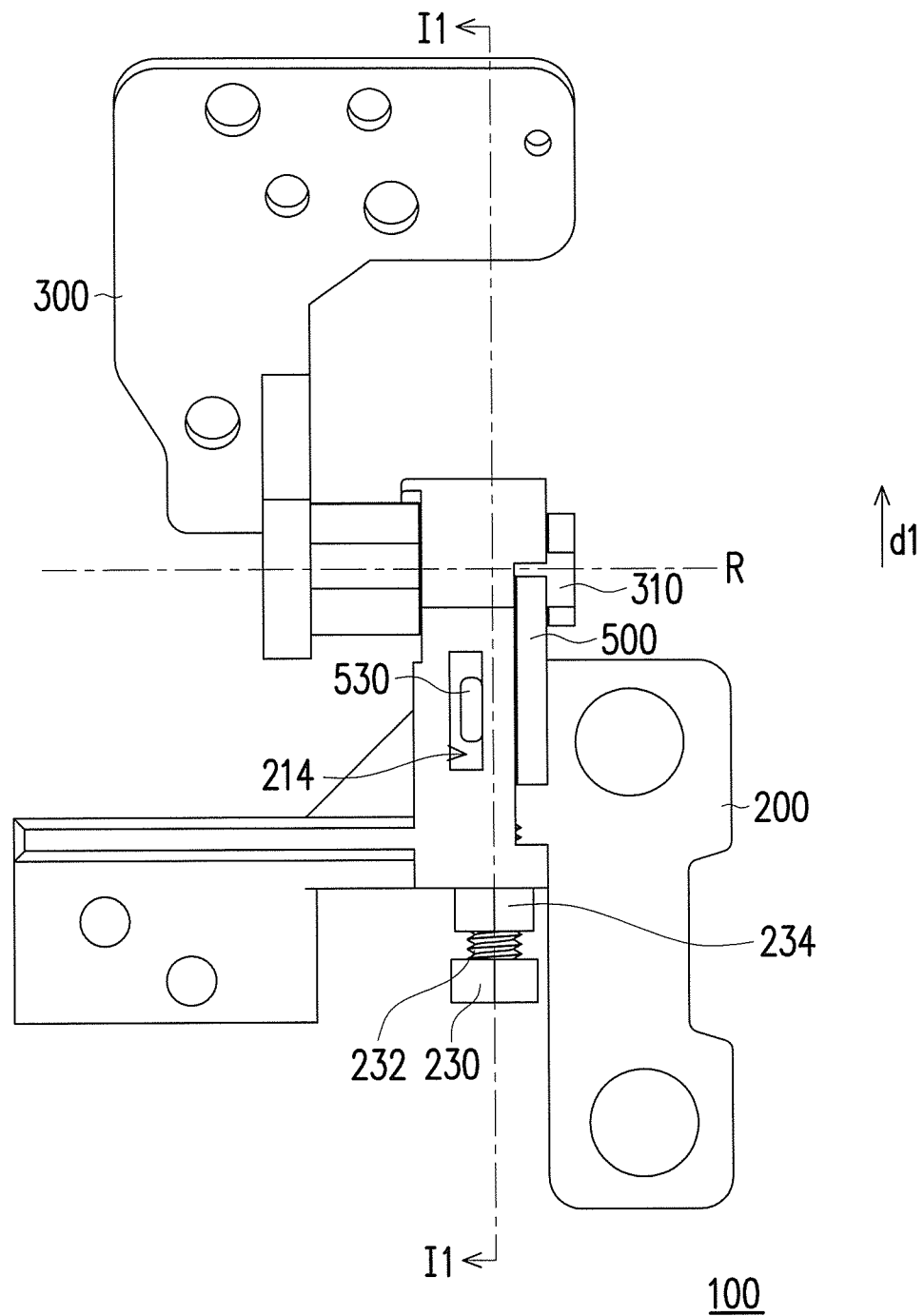
FIG. 2 is a top-view diagram illustrating the hinge module of FIG. 1.
Figure 3:
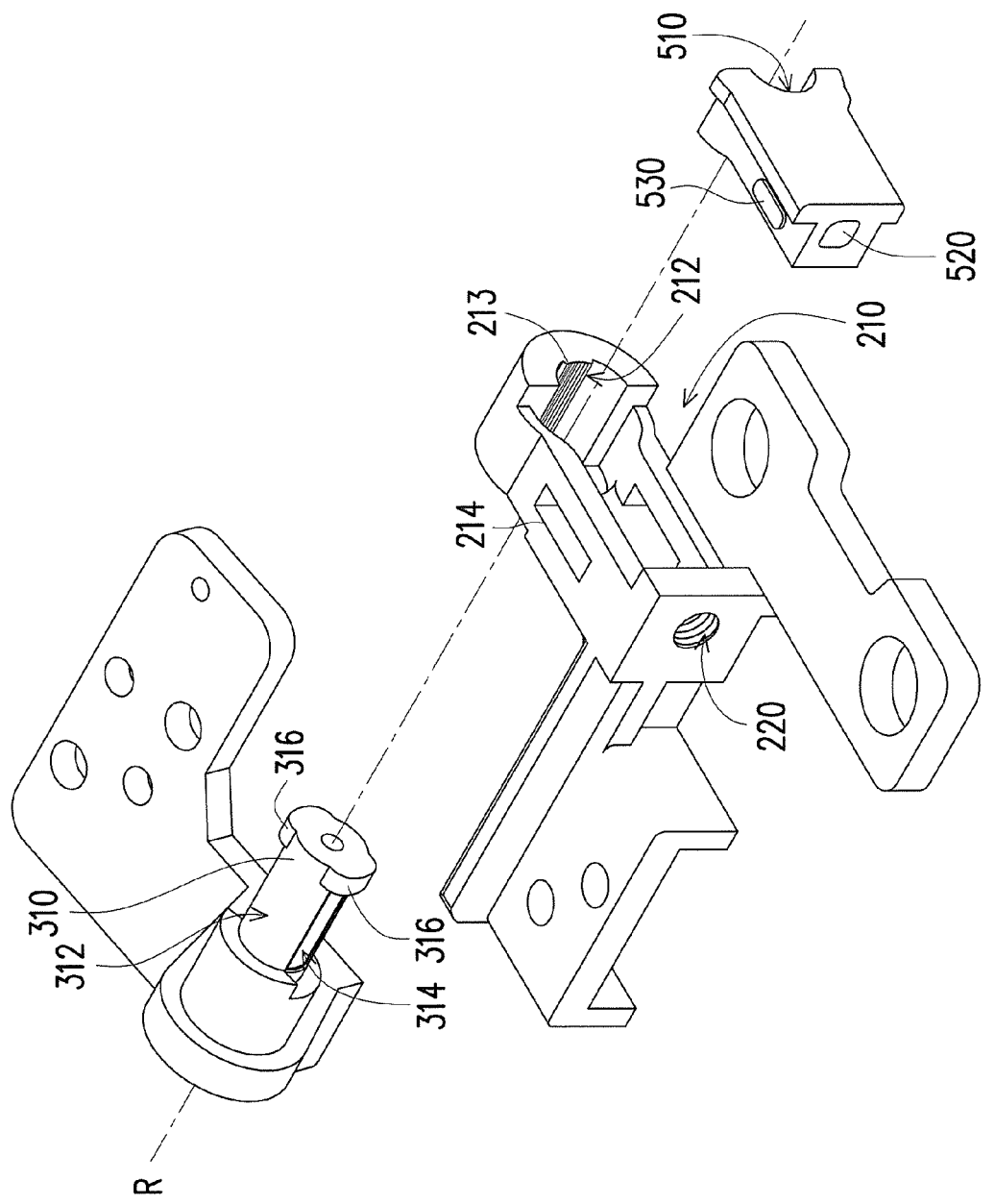
FIG. 3 is a partially exploded diagram illustrating the hinge module of FIG. 1.

FIG. 1 is a schematic diagram illustrating a hinge module according to an embodiment of the invention. FIG. 2 is a top-view diagram illustrating the hinge module of FIG. 1. FIG. 3 is a partially exploded diagram illustrating the hinge module of FIG. 1. Referring to FIG. 1 through FIG. 3, a hinge module 100 is adaptive for different bodies of an electronic device (e.g., a notebook computer) to rotate the bodies to be relative opened and closed. In an embodiment of the invention, the hinge module 100 includes a first part 200, a second part 300, an elastic element 400 and a pushing element 500. The first part 200 has a containing slot 210. The pushing element 500 is movably disposed along a direction d1 in the containing slot 210. The second part 300 has a hinge shaft 310 and is rotatably disposed along as axis R in the containing slot 210, such that the first part 200 and the second part 300 are rotated relatively around the axis R. The elastic element 400 is disposed in the containing slot 210 and pushes the pushing element 500 and constantly drives the pushing element 500 to move along the direction d1, such that the hinge shaft 310 rotatably abuts with the pushing element 500 and the first part 200. The direction d1 is perpendicular to the axis R.

In other words, the pushing element 500 and the first part 200 form a space for containing the hinge shaft 310, and the pushing element 500 has a pushing surface 510 for pushing the hinge shaft 310. In the present embodiment, the first part 200, the second part 300 and the pushing element 500 are components may by means of, for example, injection molding, which are made of plastic. The first part 200 and the pushing element 500 are made of, for example, polyoxymethylene (POM) (also referred to as plastic steel), and the second part 300 is made of, for example, a mixture of nylon and glass fiber (GF). To be more specific, in the present embodiment, the first part 200 and the pushing element 500 may be made of, for example, POM OL-10 of Polyplastics Co., Ltd., Japan, while the second part may be made of a material containing Nylon 11 (PA11) and 20% GF, but the invention is not limited thereto. Namely, the first part 200, the second part 300 and the pushing element 500 of the present embodiment may all be made by means of injection molding, so as to dramatically reduce the manufacturing cost and improve manufacturing efficiency.

Figure 4A:
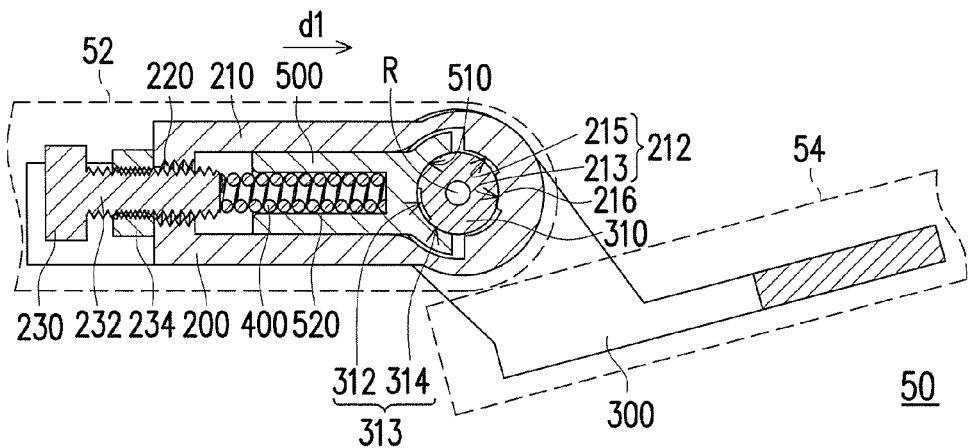
FIG. 4A through FIG. 4C are partially cross-sectional diagrams illustrating the electronic device in different states according to another embodiment of the invention.
Figure 4B:
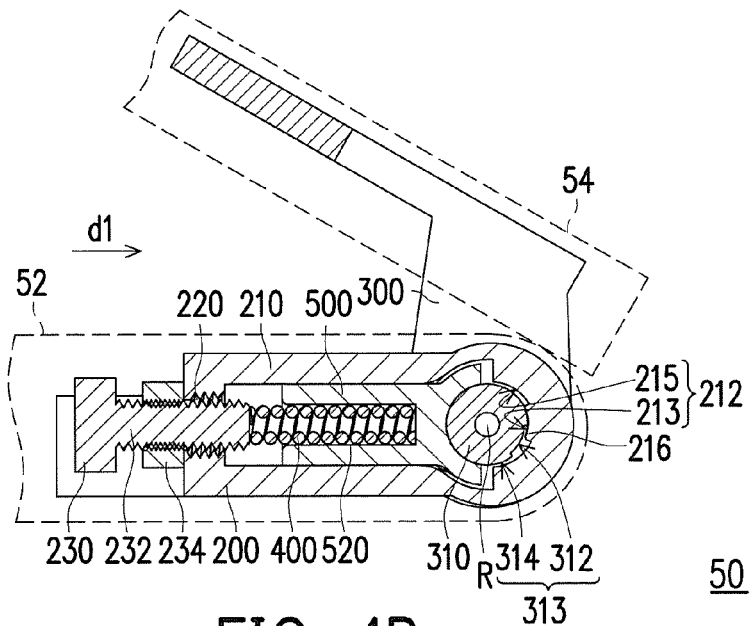
Figure 4C:
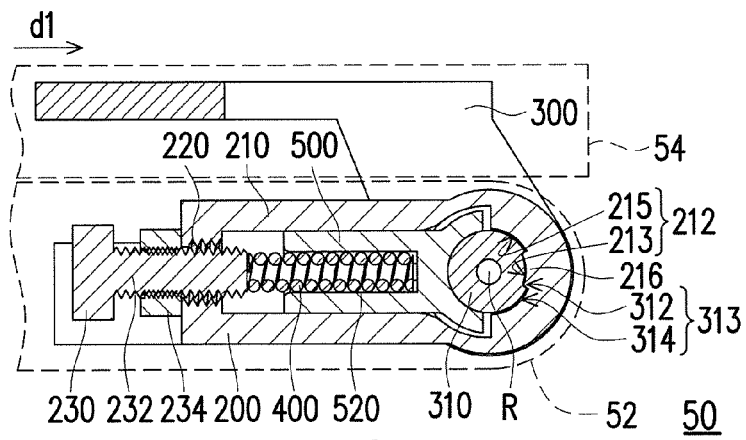

FIG. 4A through FIG. 4C are partially cross-sectional diagrams illustrating the electronic device in different states according to another embodiment of the invention. FIG. 4A illustrates a hinge module 100 equivalent to that illustrated in FIG. 1 through FIG. 3, and the cross-sectional diagram of the hinge module 100 in FIG. 4A is illustrated based on a section line I1 in FIG. 2. In another embodiment, an electronic device 50 includes a first body 52, a second body 54 and the hinge module 100. The first part 200 is connected to the first body 52, and the second part 300 is connected to the second body 54. Thus, the hinge module 100 provided by the present embodiment and the aforementioned embodiment may facilitate the electronic device 50 to have a good opening and closing capability.

Referring to FIG. 4A, in the hinge module 100 of the present embodiment, the first part 200 has a first cambered surface 212 movably contacting with the hinge shaft 310. The first cambered surface 212 has a rough structure 216 to increase friction with the hinge shaft 310. In detail, the first cambered surface 212 is divided into a first section 213 and a second section 215. A distance of the first section 213 relative to the axis R is smaller than a distance of the second section 215 relative to the axis R, and the rough structure 216 is located in the first section 213. On the other hand, the second part 300 has a second cambered surface 313 contacting with the first cambered surface 212. The second cambered surface 313 is divided into a third section 312 and a fourth section 314. A distance of the third section 312 relative to the axis R is smaller than a distance of the fourth section 314 relative to the axis R. Thus, referring to FIG. 4A through FIG. 4C, in a scenario that the electronic device 50 is in an expanded state, the rough structure 216 contacts with the fourth section 314 of the second cambered surface 313 in the hinge module 100, which brings greater friction, such that when a user adjusts the expanded state of the electronic device 50 to an appropriate angle, the angle may be maintained. In a scenario that the electronic device 50 is in a closed state, the third section 312 forms a step on the second cambered surface 313, such that the rough structure 216 is just contained in the step without contacting with the second cambered surface 313. In this way, the resistance is reduced when the user may open the electronic device 50 from the closed state, while the user may close the electronic device 50 more easily from the expanded state, and thereby, the user is provided with good use experience.

Referring to FIG. 4A through FIG. 4C, the elastic element 400 pushes the pushing element 500 and the first part 200 along the direction d1, such that the hinge shaft 310 is clipped by the pushing surface 510 and the first cambered surface 212. The direction d1 is perpendicular to the axis R.

Based on the above, in the hinge module 100 of the present embodiment, the hinge shaft 310 is clipped by the first cambered surface 212 and the pushing surface 510 by the pushing of the elastic element 400, such that the second part 300 and the first part 200 provide appropriate friction while being rotated relatively to each other. On the other hand, even though the rough structure 216 of the first cambered surface 212 is worn after being used for a long time, a normal force may be sufficiently maintained between the hinge shaft 310 and the first cambered surface 212 to provide a friction force by the pushing of the elastic element 400, and thus, the hinge module 100 of the invention has good durability.

Figure 5:
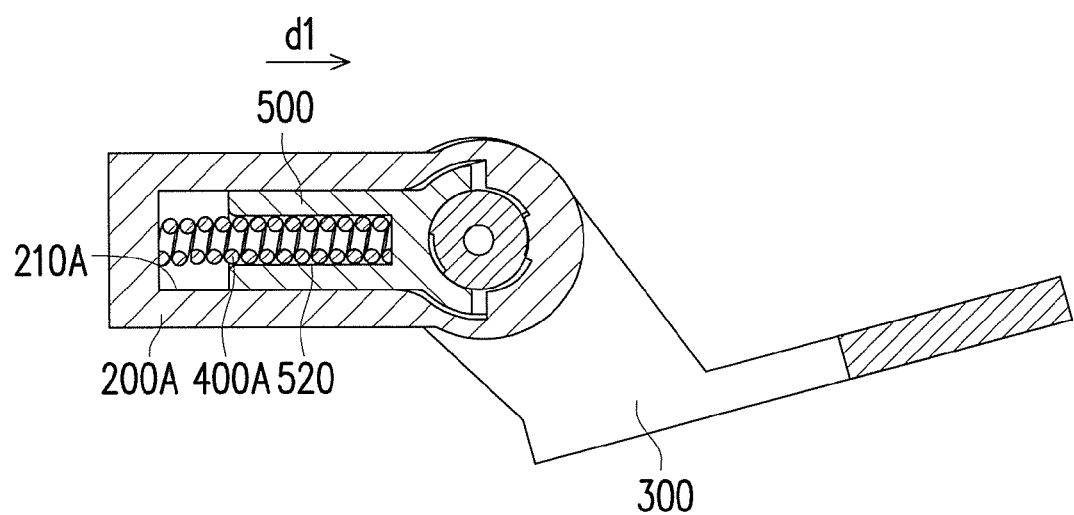
FIG. 5 is a cross-sectional diagram illustrating a hinge module according to another embodiment of the invention.

In detail, referring to FIG. 4A, in the present embodiment, the first part 200 further includes an adjustment hole 220 and an adjustment member 230. The adjustment member 230 movably passes through the adjustment hole 220 along the direction d1 to be assembled to the second part 300, and the elastic element 400 abuts between the adjustment member 230 and the pushing element 500. The pushing element 500 further includes a slot 520 for containing part of the elastic element 400, i.e., the elastic element 400 is inserted in the slot 520 to drive the pushing element 500 to increase stability. In the present embodiment, a screw thread is disposed in an inner side of the adjustment hole 220, part of the adjustment member 230 passing through the adjustment hole 220 is a screw 232. A level of an elastic restoring force provided by the elastic element 400 may be adjusted by adjusting a length of the screw 232 being inserted into the containing slot 210, such that the friction force between first cambered surface 212 and the hinge shaft 310 may be adjusted, but the invention is not limited thereto, and in other embodiment, the length of the adjustment member being inserted into the containing slot may also be adjusted by means of other structures. In this way, the hinge module 100 further provides an effect of adaptively adjusting the friction during the rotation. In the present embodiment, the adjustment member 230 further includes a fixing nut 234 locked to the screw 232 and contacting with the peripheral surface of the adjustment hole 220. Namely, the compression degree of the elastic element 400 is adjusted by adjusting the length of the adjustment member 230 passing through the adjustment hole 220, and the fixing nut 234 can be used to fix relative positions of the adjustment member 230 and the adjustment hole 220 after the position of the adjustment member 230 is well adjusted, such that the compression of the elastic element 400 is not changed easily, but the invention is not limited thereto. FIG. 5 is a cross-sectional diagram illustrating a hinge module according to another embodiment of the invention. Referring to FIG. 5, in another embodiment, an elastic element 400A may further be used to contact with an inner surface of a containing slot 210A of a first part 200A, and the compression of the elastic element 400A is directly defined by a length of the containing slot along the pushing direction d1.

Thus, the hinge module 100 is adapted to be applied in, for example, a notebook computer. In a scenario where a first body 52 connected to the first part 200 is, for example, a cradle with a keyboard of the notebook computer, and a second body 54 connected to the second part 300 is a, for example, an upper cover with a screen, the hinge module 100 is capable of providing the notebook computer with a good rotation function. The notebook computer may be closed with the hinge module 100 in a retracted state, and due to the hinge module 100 in the retracted state having lower resistance during the rotation, the user may easily open the computer, or the user may close the upper cover to the retracted state after using the notebook computer, such that the upper cover may be automatically covered and closed. Relatively, the hinge module 100 may provide greater torsion when being in an opened state, and thus, the user may adjust the screen of the upper cover to a desired angle firmly. Thereby, the hinge module 100 is capable of providing better hinge capability.

Referring to FIG. 1 and FIG. 2, in the embodiment illustrated therein, the containing slot 210 has a guide groove 214 on at least one side wall parallel to the direction d1, and an extension direction of the guide groove 214 is parallel to the direction d1. The pushing element 500 further includes a guide protrusion 530 used to slide in the guide groove 214. With the guide protrusion 530 and the guide groove 214, the pushing element 500 may slide in the containing slot 210 more stably.

Figure 6:
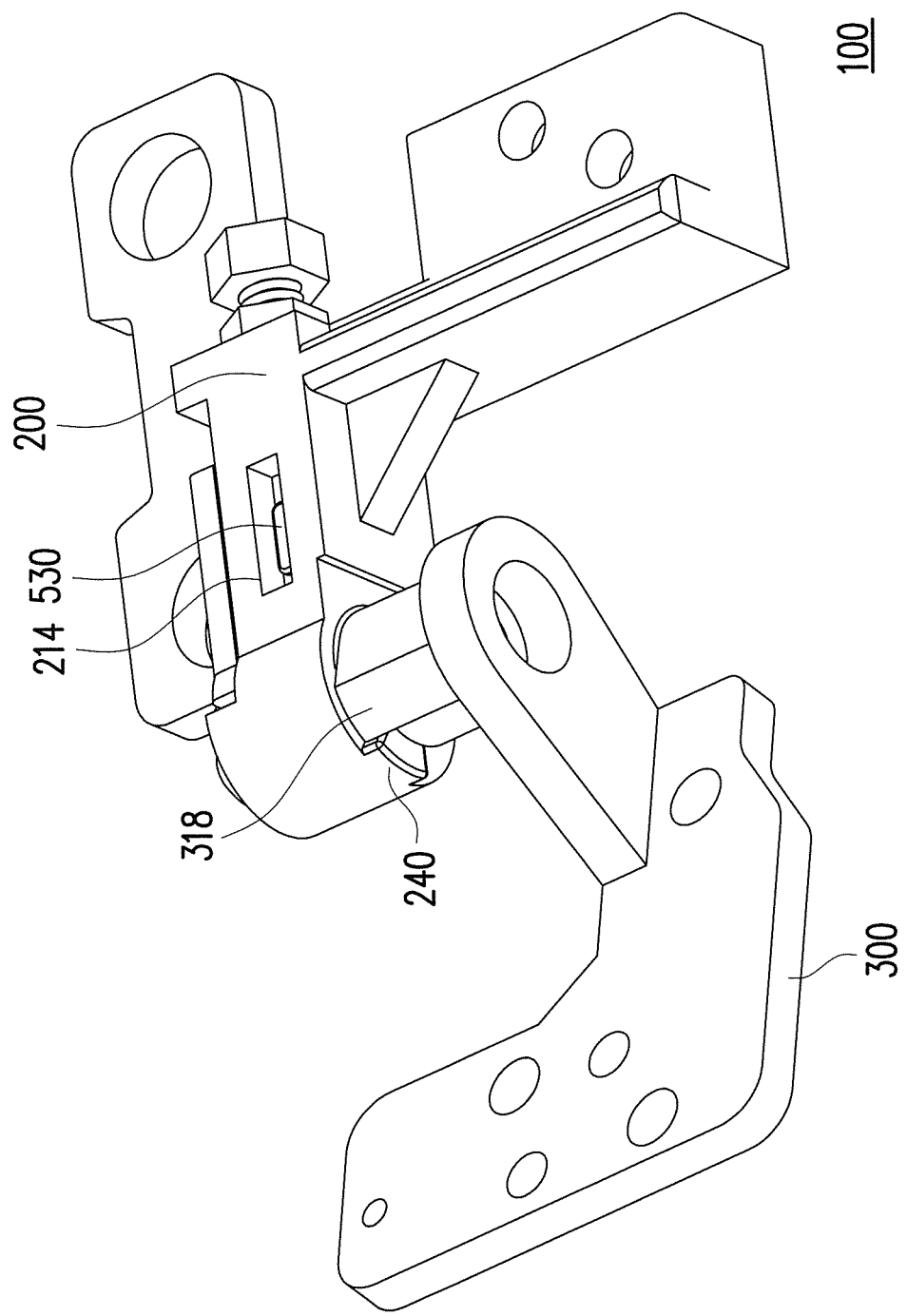
FIG. 6 is a schematic diagram illustrating the hinge module of FIG. 1 in another view angle.

FIG. 6 is a schematic diagram illustrating the hinge module of FIG. 1 in another view angle. Referring to FIG. 6, in the present embodiment, the first part 200 has a first protrusion 240 disposed near the first cambered surface 212 and protrudes along a direction parallel to the axis R. The second part 300 has a second protrusion 318 located on a surface of the hinge shaft 310. When the first part 200 and the second part 300 are rotated relatively, the first protrusion 240 and the second protrusion 318 move on a moving path around the axis R. When the first part 200 and the second part 300 are rotated relatively around the axis R to an angle, the first protrusion 240 is stopped by the second protrusion 318. Namely, the first protrusion 240 and the second protrusion 318 may define an angle for opening the hinge module 100, such that the maximum angle for opening the electronic device 50 (i.e., the notebook computer) using the hinge module 100 may be limited by using the first protrusion 240 and the second protrusion 318, so as to prevent the notebook computer from being damaged due to being opened to an excessively large angle.

Referring to FIG. 1, in the present embodiment, a position-limiting structure 316 is disposed at one end of the hinge shaft 310 protruding out of the first part 200 and the pushing element 500, and the position-limiting structure 316 protrudes from the side surface of the hinge shaft 310. That is to say, the hinge module 100 is capable of providing a more stable hinge effect.

To summarize, by means of the first part and the pushing element clipping the hinge shaft of the second part together with the pushing of the elastic element, the hinge module provided by the invention can provide good resistance while being rotated and can adjust the degree of the resistance easily. On the other hand, according to the surface design of the hinge shaft, the rotation of the hinge module can produce different rotation resistance according to different opening angles. In the meantime, the components of the hinge module can be made by a simpler manufacturing process and made of non-metallic materials, which facilitates in achieving an effect of being lighter and thinner, without using any additional lubrication fluid for assisting the friction between the components. The electronic device provided by the invention can provide a good opening and closing effect through simple components by means of the good resistance provided by the hinge module.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A hinge module, comprising:
a first part, having a containing slot;
a pushing element, movably disposed along a direction in the containing slot;
a second part, having a hinge shaft rotatably passing through the containing slot along an axis, so as to make the first part and the second part to rotate relatively about the axis; and
an elastic element, disposed in the containing slot of the first part and pushing the pushing element, wherein the elastic element constantly drives the pushing element to move along the direction, so as to make the hinge shaft to rotatably abut between with the pushing element and the first part, wherein the direction is perpendicular to the axis,
wherein the containing slot has a guide groove on at least one side wall parallel to the direction, an extension direction of the guide groove is parallel to the direction, and the pushing element further comprises a guide protrusion used to slide in the guide groove.

2. The hinge module according to claim 1, wherein the first part has a first cambered surface located on an inner wall of the containing slot, the first cambered surface movably contacts with the hinge shaft and has a rough structure to increase friction with the hinge shaft.

3. The hinge module according to claim 2, wherein the first cambered surface is divided into a first section and a second section, a distance of the first section relative to the axis is smaller than a distance of the second section relative to the axis, and the rough structure is located in the first section.

4. The hinge module according to claim 3, wherein the second part has a second cambered surface contacting with the first cambered surface, the second cambered surface is divided into a third section and a fourth section, and a distance of the third section relative to the axis is smaller than a distance of the fourth section relative to the axis.

5. The hinge module according to claim 1, further comprising:
an adjustment member, movably passed through the first part along the direction and the elastic element abutting between the adjustment member and the pushing element.

6. The hinge module according to claim 1, wherein the first part has a first protrusion, the second part has a second protrusion, and when the first part and the second part are rotated relatively, the first protrusion and the second protrusion move on a moving path around the axis, such that when the first part and the second part are rotated relatively around the axis to an angle, the first protrusion is stopped by the second protrusion.

7. The hinge module according to claim 1, wherein the pushing element further comprises a slot for containing part of the elastic element.

8. The hinge module according to claim 1, wherein the first part, the second part and the pushing element are made of plastic.

9. An electronic device, comprising:
a first body;
a second body; and
a hinge module, comprising:
a first part, connected to the first body and having a containing slot;
a pushing element, movably disposed along a direction in the containing slot;

a second part, connected to the second body and having a hinge shaft rotatably passing through the containing slot along an axis, so as to make the first part and the second part to rotate relatively about the axis; and an elastic element, disposed in the containing slot of the first part and pushing the pushing element, wherein the elastic element constantly drives the pushing element to move along the direction, so as to make the hinge shaft to rotatably abut between the pushing element and the first part, wherein the direction is perpendicular to the axis, wherein the containing slot has a guide groove on at least one side wall parallel to the direction, an extension direction of the guide groove is parallel to the direction, and the pushing element further comprises a guide protrusion used to slide in the guide groove.

10. The electronic device according to claim 9, wherein the first part has a first cambered surface located on an inner wall of the containing slot, the first cambered surface movably contacts with the hinge shaft and has a rough structure to increase friction with the hinge shaft.

11. The electronic device according to claim 10, wherein the first cambered surface is divided into a first section and a second section, a distance of the first section relative to the axis is smaller than a distance of the second section relative to the axis, and the rough structure is located in the first section.

12. The electronic device according to claim 11, wherein the second part has a second cambered surface contacting with the first cambered surface, the second cambered surface is divided into a third section and a fourth section, and a distance of the third section relative to the axis is smaller than a distance of the fourth section relative to the axis.

13. The electronic device according to claim 9, further comprising:

an adjustment member, movably passed through the first part along the direction and the elastic element abutting between the adjustment member and the pushing element.

14. The electronic device according to claim 9, wherein the first part has a first protrusion, the second part has a second protrusion, and when the first part and the second part are rotated relatively, such that when the first part and the second part are rotated relatively around the axis to an angle, the first protrusion is stopped by the second protrusion.

15. The electronic device according to claim 9, wherein the pushing element further comprises a slot for containing part of the elastic element.

16. The electronic device according to claim 9, wherein the first part, the second part and the pushing element are made of plastic.

* * * * *